UNITED STATES PATENT OFFICE.

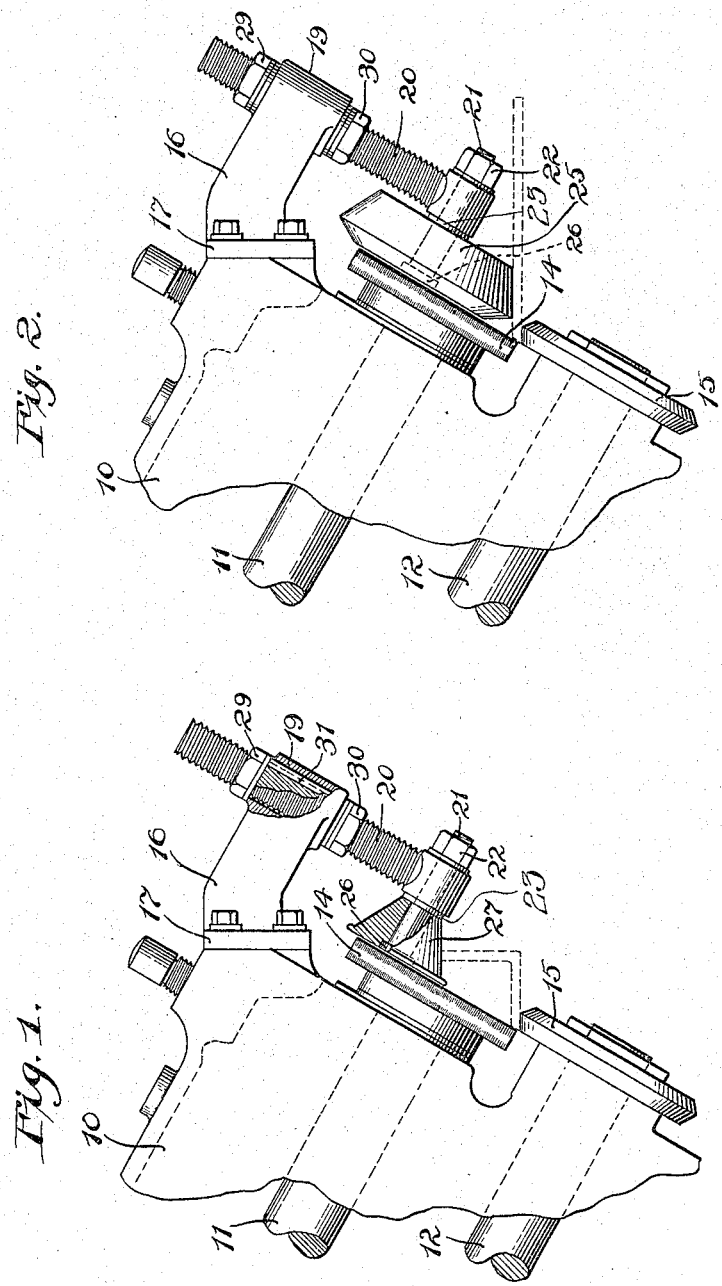

EDWARD T. HENDEE, OF CHICAGO, ILLINOIS.

HOLDDOWN DEVICE FOR BEVEL-SHEARING MACHINES.

1,175,519.  Specification of Letters Patent.  Patented Mar. 14, 1916.

Application filed June 3, 1915. Serial No. 32,004.

*To all whom it may concern:*

Be it known that I, EDWARD T. HENDEE, a citizen of the United States, and a resident of Chicago, in the county of Cook and State of Illinois, have invented certain new and useful Improvements in Holddown Devices for Bevel-Shearing Machines; and I do hereby declare that the following is a full, clear, and exact description thereof, reference being had to the accompanying drawings, and to the characters of reference marked thereon, which form a part of this specification.

This invention relates to a novel holddown device for bevel shearing machines to hold the work in proper relation to the rotary shearing elements of the machine during the beveling operation.

The invention also relates to a novel holddown attachment which may be applied to standard bevel shearing machines.

The purpose of the invention is to produce a simple and inexpensive device which is adapted to be applied to the frame of the shearing machine by a strong and rigid connection and to engage the work in front of the rotary shearing elements so as to prevent the work from tipping upwardly during the beveling operation.

A further object of the invention is to provide a device of this character which may be used in connection with either flat, angle, or other non-flat work.

Other objects of the invention will appear from the following description, and the invention consists in the elements and combinations of elements shown in the drawings, described in the specification and set forth in the appended claims.

In the drawings:—Figure 1 is a fragmentary view of a bevel shearing machine showing one type of my invention applied thereto. Fig. 2 is a similar view showing a modification of the hold-down device adapted to operate on plates and the like.

As shown in the drawings, 10 designates the front portion of the shearing machine frame which carries bearings for two parallel inclined, rotative shafts 11, 12, on the outer ends of which are mounted circular blades 14, 15, respectively, which are formed at their peripheries to bevel the work inserted between them. The construction herein shown is that of a standard bevel shearing machine and need not be further described. It is to be understood, however, that my hold-down device may be used with other beveling machines of the general type herein shown.

Referring to the hold-down device constituting the subject matter of the present invention, the same is made as follows: 16 designates a bracket formed with a flanged base 17 through which extend headed screws 18 by which the bracket is attached to a planed-off surface of the frame 10. Said bracket 16 is formed at its outward end to provide a hollow bearing or sleeve 19 to receive the upper end of a screw-threaded shaft 20. The bearing and shaft are shown as arranged in a plane parallel to the planes of rotation of the blades. Said shaft 20 is provided at its lower end with a transverse opening to receive a spindle 21, the spindle being fixed to the shaft by means of a nut screw-threaded to the spindle and co-acting with an opposing shoulder 23 formed on the spindle inside of the shaft 20. The said spindle carries at its inner end a roller 25 which is flat on its inner side to fit closely to the flush face of the upper shearing blade 14 and is beveled on its outer side at such an angle to its axis as to bring the lower or active part of said face in a plane parallel to the plane of the work in the machine. The said roller 25 is fixed on the spindle 21 by means of a head 26 on the inner end of said spindle which enters a counter-sunk recess in the rear flat face of the roller. The roller 25 shown in Fig. 2 is made of nearly the same diameter as the adjacent shearing disk 14 so as to bring its conical bearing face in position to bear upon flat work or the like, as indicated in dotted lines in Fig. 2. The bearing roller 27 of the device shown in Fig. 1 is made smaller than the bearing roller 25 to adapt the attachment to operate in connection with angle bars in the manner indicated in dotted lines in said Fig. 1. It will be understood that the rollers 25 and 27 are adapted to be used interchangeably on the same spindle, the size of the rollers being the only difference between the machines shown in Figs. 1 and 2. The said rollers are adjustable toward and from the shearing faces of the beveling blades to adapt the device to work of varying dimensions, and also to adapt it to bearing rollers of different diameters to operate on flat and angle work, as shown in Figs. 2 and 1, respectively. This is accomplished in the present instance by screw-threading the shaft 20 and providing it above and below the bearing 19 with holding nuts 29, 30, respectively, which are adapted to bear against the upper and lower ends, respectively, of the bearing and to thereby hold said shaft and the roller carried thereby rigidly in a given position of adjustment. In order to prevent the shaft from turning in its bearing I may provide the shaft and bearing with keyways or slots to receive a key or spline 31.

The device described provides means for firmly holding the work at a given or proper angle to the coöperating edges of the blades, so as to insure a uniform bevel cut along the edge of the work. If the work be not thus firmly held in the machine the bevel cut is likely to be irregular and the margin of the work on which the bevel is being cut is liable to be deformed in a manner to weaken the plate or other work. The attachment herein shown avoids these defects.

The hold-down device may constitute a unitary part of the machine or may be applied thereto, as an attachment. The construction is simple and inexpensive to apply and firmly holds the work to the beveling shears.

The structural details are capable of some variation within the scope of the claims hereto appended and it is the intent to claim all of inherent novelty in the device as shown and described.

I claim as my invention:

1. The combination with the rotary shearing elements of a bevel shearing machine, of a work hold-down device arranged exterior to the upper shearing element and provided with a conically faced roller adapted to bear on the upper face of the work, and rotating on an axis parallel to the axes of rotation of said shearing elements.

2. The combination with the rotary shearing elements of a bevel shearing machine, of a work hold-down device arranged exterior to the upper shearing element and provided with a conically faced roller adapted to bear on the upper face of the work, and means to adjust the bearing roller toward and from the coöperating edges of the shearing element and to hold the same in adjusted position.

3. The combination with a frame, two parallel inclined shafts rotatively mounted therein and coöperative circular shearing blades carried by said shafts, of a work hold-down device comprising an overhanging bracket attached to the frame above said shearing blades, a shaft carried by said bracket and disposed parallel to the planes of rotation of said blades, a spindle carried by the lower end of said shaft and a roller mounted on said spindle and formed with a conical face to engage the work.

4. The combination with a frame, two parallel inclined shafts rotatively mounted therein and coöperative circular shearing blades carried by said shafts, of a work hold-down device comprising an overhanging bracket attached to the frame above said shearing blades, a shaft carried by said bracket and disposed parallel to the planes of rotation of said blades, a spindle carried by the lower end of the shaft, a roller mounted on said spindle and formed with a conical face to engage the work and means for adjusting said shaft endwise in its bearing to adapt the device to work of different dimensions.

5. The combination with a frame, two parallel inclined shafts rotatively mounted therein and coöperative circular shearing elements carried by said shafts, of a work hold-down device comprising an overhanging bracket attached to the frame above said shearing blades, a shaft carried by said bracket and disposed parallel to the planes of rotation of said blades, a spindle carried by the lower end of the said shaft, a roller mounted on said spindle and formed with a conical face to engage the work, said shaft being screw-threaded in its part which extends through said bearing, upper and lower nuts screw-threaded to the shaft to engage the upper and lower parts of the bearing and means to prevent the shaft from rotating in its bearing.

6. A hold-down attachment for bevel shearing machines comprising a bracket adapted to be removably attached to a machine frame, a shaft carried thereby with means to adjust it in the direction of its axis and lock it in adjusted position, a spindle carried by the shaft and a roller rotatively mounted on said spindle and provided with a conical bearing face.

7. A hold-down attachment for bevel shearing machines comprising a bracket adapted to be removably attached to a machine frame, a shaft carried thereby with means to adjust it in the direction of its axis and lock it in adjusted position, said shaft being provided at its lower end with a transverse opening, a spindle extending therethrough and provided with a shoulder to engage one side of the shaft bearing and screw-threaded at its other end to receive a holding nut and a roller rotatively mounted on said spindle and provided with a conical bearing face.

8. The combination with the rotary shearing elements of a bevel shearing machine, of a work hold-down device exterior to the upper shearing element comprising a support, a spindle carried thereby adapted to interchangeably receive bearing rollers of different diameters to bear against the work and means to adjust said support to adapt the device to different diameters of bearing rollers and to thereby adapt the device to flat and angle work.

In testimony, that I claim the foregoing as my invention I affix my signature in the presence of two witnesses, May, A. D. 1915.

EDWARD T. HENDEE.

Witnesses:
H. B. KRAUT,
W. A. MOREY.